US007020691B2

(12) United States Patent
Ota et al.

(10) Patent No.: US 7,020,691 B2
(45) Date of Patent: Mar. 28, 2006

(54) PROMOTION SYSTEM AND METHOD OF MANAGING AUTOMATIC VENDING MACHINE BY THE PROMOTION SYSTEM

(75) Inventors: Michihiro Ota, Sakado (JP); Hiroaki Yoshida, Tsurugashima (JP); Hiroaki Shinada, Tsurugashima (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 791 days.

(21) Appl. No.: 09/999,336

(22) Filed: Nov. 1, 2001

(65) Prior Publication Data

US 2002/0055994 A1 May 9, 2002

(30) Foreign Application Priority Data

Nov. 6, 2000 (JP) .............................. 2000-337757

(51) Int. Cl.
*G06F 15/16* (2006.01)

(52) U.S. Cl. ...................... 709/217; 709/200; 709/223; 709/227

(58) Field of Classification Search ................ 709/203, 709/218, 200, 217, 223, 227; 705/16, 22, 705/28; 370/218, 238.1, 392; 455/556.1
See application file for complete search history.

(56) References Cited

U.S. PATENT DOCUMENTS

| | | | | |
|---|---|---|---|---|
| 5,991,749 A * | 11/1999 | Morrill, Jr. | ................... | 705/44 |
| 6,018,657 A * | 1/2000 | Kennedy et al. | ........... | 455/426.1 |
| 6,032,859 A * | 3/2000 | Muehlberger et al. | ...... | 235/449 |
| 6,038,491 A * | 3/2000 | McGarry et al. | ............ | 700/231 |
| 6,167,248 A * | 12/2000 | Hamalainen et al. | ........ | 455/403 |
| 6,185,208 B1 * | 2/2001 | Liao | ............................ | 370/392 |
| 6,430,470 B1 * | 8/2002 | Nakajima et al. | ............ | 700/237 |
| 6,457,038 B1 * | 9/2002 | Defosse | ....................... | 709/200 |
| 6,462,644 B1 * | 10/2002 | Howell et al. | .............. | 340/5.92 |
| 6,490,272 B1 * | 12/2002 | Eriksson | ...................... | 370/349 |
| 6,584,309 B1 * | 6/2003 | Whigham | ................. | 455/414.1 |
| 6,658,248 B1 * | 12/2003 | Lee | ............................. | 340/5.9 |
| 6,658,323 B1 * | 12/2003 | Tedesco et al. | ............. | 700/236 |
| 6,763,336 B1 * | 7/2004 | Kolls | .......................... | 705/44 |
| 6,819,658 B1 * | 11/2004 | Agarwal et al. | ............ | 370/316 |
| 6,885,877 B1 * | 4/2005 | Ozaki et al. | ............. | 455/556.1 |

* cited by examiner

*Primary Examiner*—Rupal Dharia
*Assistant Examiner*—Kristie D. Shingles
(74) *Attorney, Agent, or Firm*—Welsh & Katz, Ltd.

(57) ABSTRACT

To send point information indicated by an automatic vending machine to a center unit by a packet communication function of a portable telephone of a user of the automatic vending machine, a free space in a single packet of the point information to be sent from the automatic vending machine to the center unit is used to send management information such as sales information, stock information, failure information and the like of the automatic vending machine to the center unit.

12 Claims, 4 Drawing Sheets

PROMOTION SYSTEM AND METHOD OF MANAGING AUTOMATIC VENDING MACHINE BY THE PROMOTION SYSTEM

BACKGROUND OF THE INVENTION

1. Field of the Invention

The present invention relates to a promotion system for sales promotion of commodities of automatic vending machines by issuing points when such commodities are sold and to a method of management of the automatic vending machines by the promotion system.

2. Description of the Related Art

As a conventional method of collectively managing the states of automatic vending machines by a management center, there is a known method which transmits management information such as sales information, failure information and the like of the automatic vending machine to the management center by communication equipment which is provided to the automatic vending machine.

But, the aforesaid conventional method was hard to become widespread because of high costs of providing the communication equipment to the individual automatic vending machines and high operation costs such as a communication charge.

The inventor has proposed in Japanese Patent Application No. 11-280034 and Japanese Patent Application No. 2000-210217 a promotion system by which point information having points encrypted is shown to a commodity purchaser when a commodity is sold, the purchaser merely sends the shown point information to a center unit by a portable telephone, the center unit deciphers the point information and adds points, and a service corresponding to the added points is provided to the commodity purchaser.

Here, the aforesaid point information is sent from the portable telephone to the center unit by a packet communication function of the portable telephone, but an information content of the point information is generally smaller than an information content of a single packet, namely a charging unit information content, according to the packet communication function of the portable telephone.

SUMMARY OF THE INVENTION

Accordingly, it is an object of the present invention to provide a promotion system and a method of managing an automatic vending machine by the promotion system which, in order to send point information indicated by an automatic vending machine to a center unit by the portable telephone of the user of the automatic vending machine, send management information such as sales information, stock information, failure information or the like of the automatic vending machine to the center unit by using a portion less than a charging unit information content, so that the automatic vending machine can be managed collectively by the center unit without providing communication equipment to the automatic vending machine.

The promotion system of the present invention is a promotion system by which point information related to predetermined points is shown from an automatic vending machine to a user of the automatic vending machine when a commodity is sold, the user sends the point information together with identification information of the user to a center unit by his or her portable telephone, and the center unit receives the point information, stores and manages points corresponding to the point information in connection with the user and provides a predetermined service corresponding to the points to the user, wherein the automatic vending machine is provided with management information adding means which adds the management information of the automatic vending machine to the point information within a range of a charging unit information content of the portable telephone, and point information showing means which shows to the user the point information to which the management information is added by the management information adding means; and the center unit is provided with management information segmenting means which segments the management information from the packet received from the user's portable telephone, and automatic vending machine managing means which manages the automatic vending machine on the basis of the management information segmented by the segmenting means.

Here, it can be configured that the portable telephone is provided with packet communication means which transmits the point information to the center unit by the packet communication and the charging unit information content of the portable telephone is an information content which can be transmitted by a single packet in the packet communication.

It can be configured that the management information adding means adds the management information to the point information when the management information is smaller than a difference between the point information and the information content which can be transmitted by the single packet and, when the management information is larger than the difference between the point information and the information content which can be transmitted by the single packet, segments the management information of the automatic vending machine and adds the segment management information to the point information.

It can be configured that the segment management information contains a segmentation number indicating a segmentation order of the management information and identification information of the automatic vending machine; and the center unit contains merging means which merges the management information from plural pieces of segment management information on the basis of the segmentation number and the identification number of the automatic vending machine.

The point information indicating means can be configured to have communication means which communicates with the portable telephone carried by the user to show the point information to the user.

The management information of the automatic vending machine can be configured to contain sales information, stock information, failure information and the like of the automatic vending machine.

The method of managing an automatic vending machine using the promotion system of the present invention is a method of managing an automatic vending machine using a promotion system by which point information related to predetermined points is shown from an automatic vending machine to a user of the automatic vending machine when a commodity is sold, the user sends the point information together with identification information of the user to a center unit by his or her portable telephone, and the center unit receives the point information, stores and manages points corresponding to the point information in connection with the user and provides a predetermined service corresponding to the points to the user, wherein the automatic vending machine adds the management information of the automatic vending machine to the point information within a range of a charging unit information content of the portable telephone when an information content of the point information does not fill the charging unit information content of the portable telephone and, the center unit segments the management information from the packet received from the user's portable telephone and manages the automatic vending machine on the basis of the segment management information.

Here, it can be configured that the portable telephone sends the point information to the center unit by packet communication, and the charging unit information content of the portable telephone is an information content which can be sent by a single packet in the packet communication.

The automatic vending machine adds the management information to the point information and shows the point information to which the management information is added to the user when the management information of the automatic vending machine is smaller than a difference between the point information and the information content which can be sent by the single packet, and when the management information of the automatic vending machine is larger than the difference between the point information and the information content which can be sent by the single packet, the automatic vending machine segments the management information of the automatic vending machine, adds the segment management information to the point information and shows to the user the point information to which the segment management information is added.

It can be configured that the segment management information contains the segmentation number showing a segmentation order of the management information and identification information of the automatic vending machine, and the center unit merges to obtain the management information from plural pieces of segment management information on the basis of the segmentation number and the identification information of the automatic vending machine.

Further, it can be configured that the point information is shown by communicating with the portable telephone carried by the user.

Further, the management information of the automatic vending machine can be configured to contain sales information, stock information, failure information and the like of the automatic vending machine.

According to the promotion system and the management method of the automatic vending machine using the promotion system of the present invention, when sending point information shown by the automatic vending machine to the center unit by the portable telephone of the user of the automatic vending machine, management information such as sales information, stock information, failure information and the like of the automatic vending machine are sent to the center unit by using the portion not filling the charging unit information content, it is possible to manage the automatic vending machines by the center device without an installing cost for installing communication devices and a communication cost.

DESCRIPTION OF THE PREFERRED EMBODIMENTS

Embodiments of the promotion system to which the present invention pertains and the management method of the automatic vending machine using the promotion system will be described in detail with reference to the accompanying drawings.

Figure 1:
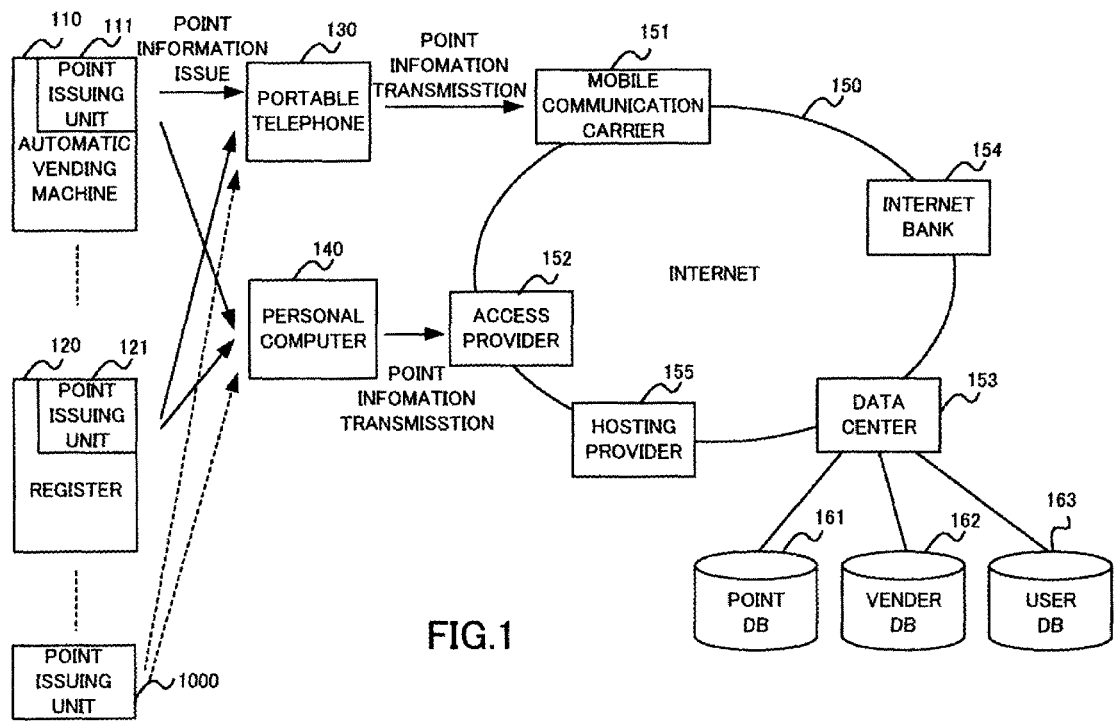
FIG. 1 is a system configuration diagram showing an example configuration of the promotion system according to the present invention.

FIG. 1 is a system configuration diagram showing an example configuration of a promotion system to which the promotion system according to the present invention is applied.

In FIG. 1, this promotion system issues points for commodities sold by a plurality of automatic vending machines 110 disposed outdoors or indoors or cash registers 120 disposed in various types of stores and shops.

Specifically, this promotion system enables the sales promotion of commodities sold by the automatic vending machines 110 or the sales promotion of various kinds of commodities in stores and shops where the cash registers 120 are provided.

Every time a commodity is sold by the automatic vending machine 110, point issuing unit 111 disposed in the automatic vending machine 110 generates point information corresponding to the selling price, sold quantity and the like of the sold commodity and indicates the point information on an unshown display section disposed on the point issuing unit 111.

Every time sales processing is made by the cash register 120, point issuing unit 121 disposed in the cash register 120 also generates point information management information of the automatic vending machine contains sales information, stock information, failure information and the like of the automatic vending machine.

Every time predetermined sales processing is made, independent point issuing unit 1000 also generates point information corresponding to the selling price, sold quantity and the like and indicates the point information on an unshown display section disposed on the point issuing unit 1000.

The aforesaid point information contains the following:
1) a module code, and
2) a secret code.

Here, the module code is used to identify the aforesaid point issuing units 111, 121 or the like, and this promotion system is configured to store and manage the states of the automatic vending machine 110, the cash register 120 and the like in accordance with the module code by vender database (vender DB) 162 of data center 153.

The secret code contains the following:
1) point issue number,
2) number of points, and
3) parity.

Here, the point issue number is a serial number issued every time points are issued by the point issuing units 111, 121 respectively and used to check double use and unauthorized use of the point information.

The number of points is the number of points which a user obtains at every purchase, and the parity is additional information used to check that the point information transmitted from the user is free from an error or tampering while being transmitted including encryption and decryption processing.

The secret code is generated by encrypting such information by a previously recorded cryptographic key.

The user of the promotion system reads and records the point information indicated on the display sections of the point issuing units 111, 121, inputs the recorded point information to portable telephone 130 or personal computer 140 and sends it to the data center 153 together with ID (identification information) for identifying the user and a predetermined password.

It may be configured that an IR communication device is built in the point issuing units 111, 121 to input the point information to the portable telephone 130 by communicating with the portable telephone 130 using the IR communication device.

The point issuing units 111, 121 may be provided with means for printing to output the point information.

The point issuing unit 121 mounted on the cash register 120 may be designed to print to output the point information which is generated by the point issuing unit 121 onto a receipt printed by and output from the cash register 120.

The data center 153 is provided with point database (point DB) 161 which is configured as a web server on the Internet 150 and stores and manages the points obtained by the user in correspondence with the user ID, the vender database (vender DB) 162 which stores and manages the states and the like of the automatic vending machine 110 and the cash register 120 according to the module code, and user database (user DB) 163 which stores and manages individual information of the users.

The point information is transmitted from the portable telephone 130 carried by the user to the data center 153 through the portable telephone 130, mobile transmission carrier 151 and the Internet 150.

The point information is transmitted from the personal computer 140 of the user to the data center 153 through the personal computer 140, user access provider 152 and the Internet 150.

The data center 153 receives the point information from the user's portable telephone 130 or the personal computer 140 and checks the user ID and password with reference to the user database 163.

Then, the module code is checked with reference to the vender database 162.

The secret code is decrypted, the parity, the point issue number and the number of points are checked, and the point database 161 is updated according to the checked results.

The data center 153 also conducts the following:
1) management of the users on the basis of the registration and update of the user database 163,
2) management of the points on the basis of the point database 161,
3) management of the point issuing unit on the basis of the registration and update of the vender database 162,
4) management of various types of lotteries and winners on the basis of the points stored in the point database 161,
5) provision of marketing information to the administrator of the automatic vending machines 110 and stores and shops or the like where the cash register 120 is disposed, and
6) management of sales information, commodities, changes, failures and the like of the automatic vending machines 110.

The Internet 150 has thereon Internet bank 154 which settles an account related to the aforesaid points for the data center 153, hosting provider 155 which serves instead of the data center 153 to deliver home pages in order to provide marketing information to the administrator of the automatic vending machines 110 and the stores and shops or the like where the cash register 120 is disposed, and the like.

The promotion system of the present invention uses the promotion system shown in FIG. 1 to manage the management information such as sales information, stock information and failure information of the automatic vending machine 110.

In the promotion system of the aforesaid embodiment, the portable telephone 130 uses packet communication of the portable telephone 130 to send point information.

Figure 2:
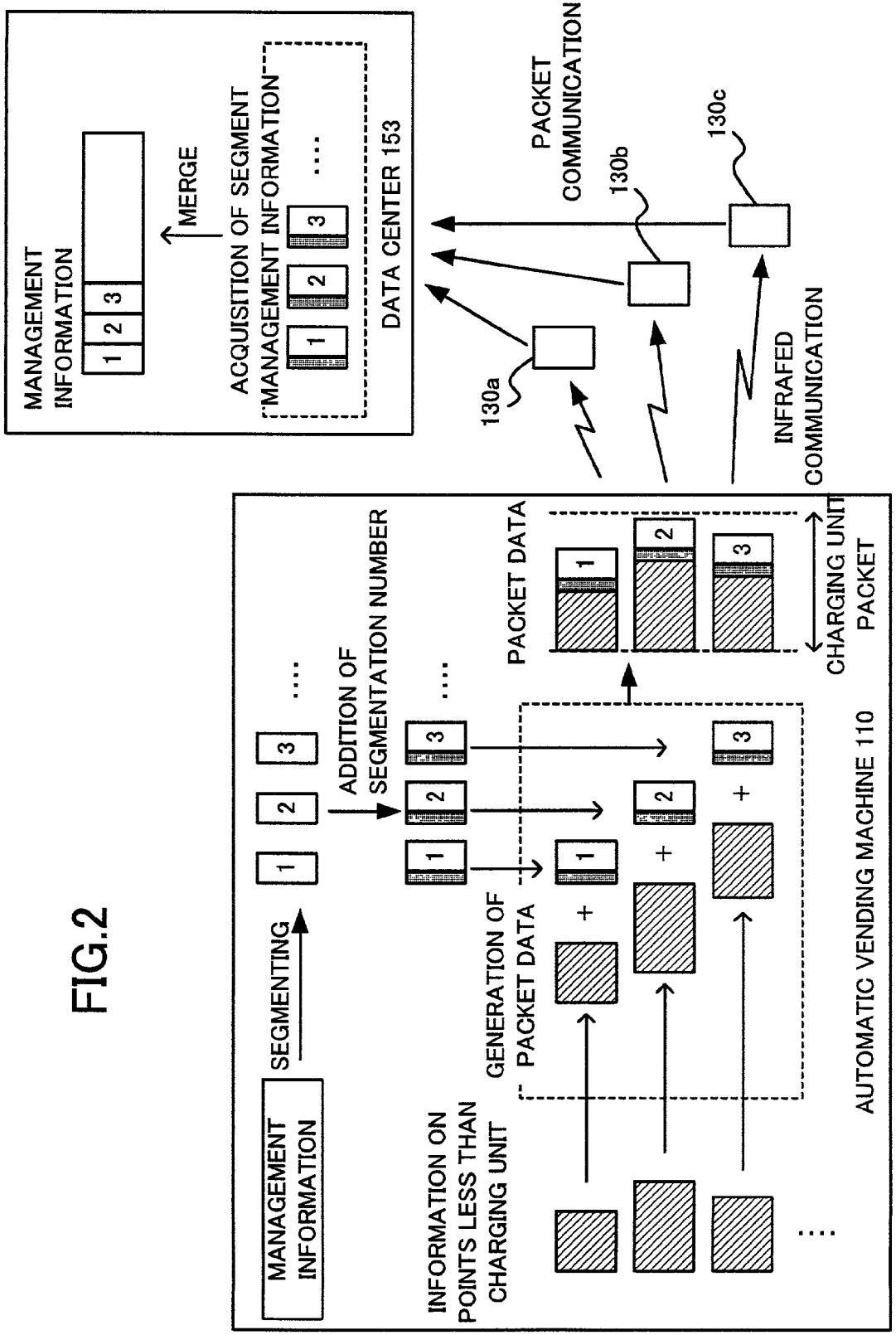
FIG. 2 is a diagram showing communication paths of management information of the automatic vending machine.

FIG. 2 is a diagram for illustrating example communication processing of management information of the automatic vending machine 130 performed between the automatic vending machine 110 and the data center 153.

In FIG. 2, the automatic vending machine 110 automatically generates management information containing information such as a stock status in the automatic vending machine 110 in response to a request from the data center 153 or according to time or the like previously determined for the automatic vending machine 110.

Subsequently, the automatic vending machine 110 segments the generated management information into multiple pieces of information and generates segment management information. The segment management information is added a segmentation number and identification information for identifying the automatic vending machine 110. Here, the segmentation number is information necessary to restore the original management information by merging the segment management information and to indicate the order of position of each piece of segment management information of the original management information.

Meanwhile, the automatic vending machine 110 issues point information related to points corresponding to the sold commodity when it is sold.

Here, when a data amount of the issued point information does not fill the data amount of a single packet which is a charging unit in the packet communication performed between the portable telephone 130 and the data center 153 and does not exceed it even when the segment management information having the added segmentation number is added to the point information, the automatic vending machine 110 adds segment management information to the issued point information and generates packet data.

And, the packet data is sent to the portable telephones 130a, 130b, 130c, . . . , which are respectively carried by users having obtained point information, by infrared communication and to the data center 153 by a transmission operation of the portable telephones 130a, 130b, 130c, . . .

The data center 153 extracts the aforesaid segment management information from the packet data received from the respective portable telephones 130a, 130b, 130c, . . . and merges the segment management information according to the segmentation number added to the segment management information and the identification information of the automatic vending machine to obtain the management information of the automatic vending machine 110.

Figure 3:
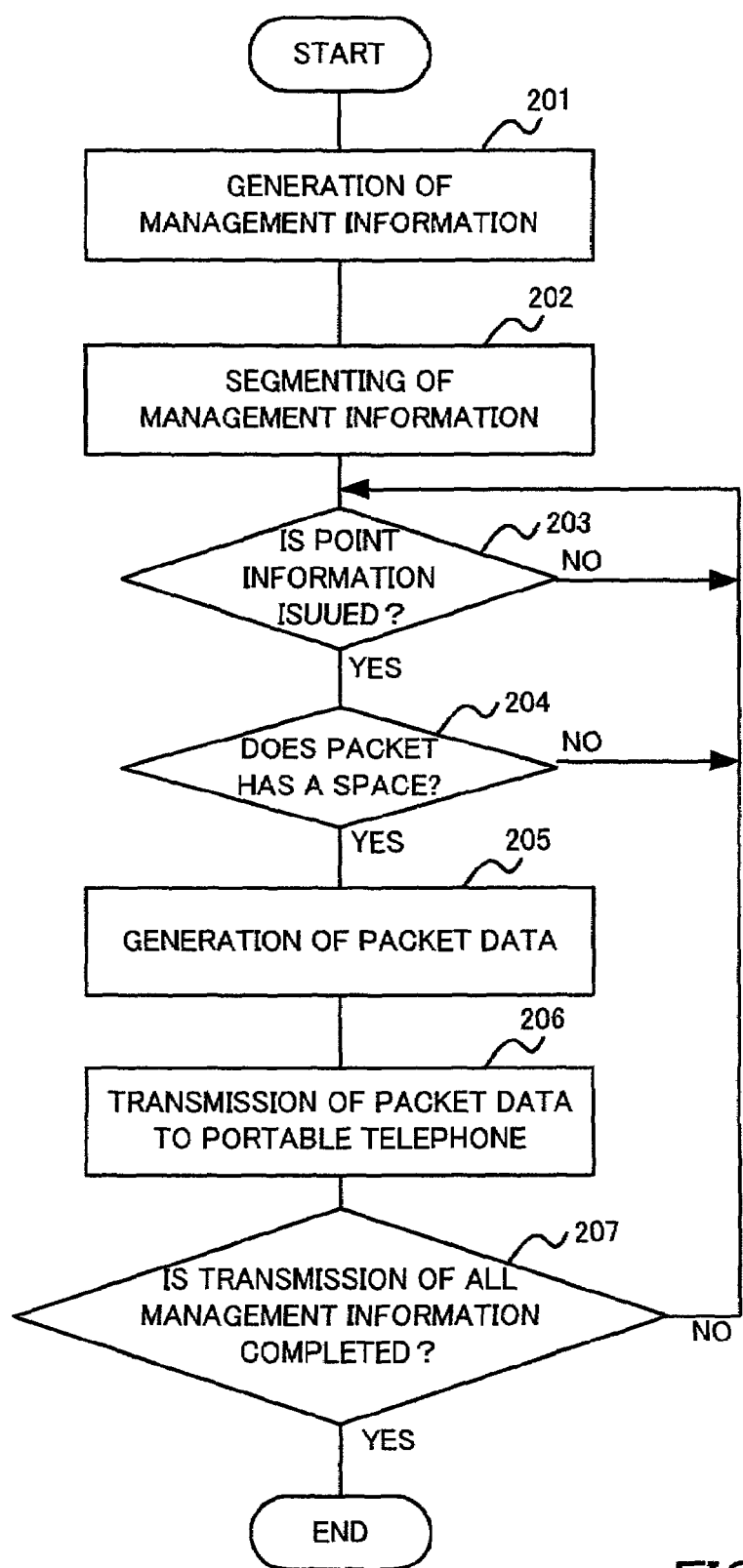
FIG. 3 is a flow chart showing a flow of an operation of the automatic vending machine shown in FIG. 2.

FIG. 3 is a flow chart illustrating a flow of the operation of the automatic vending machine 110 shown in FIG. 2.

In FIG. 3, the automatic vending machine 110 generates management information (step 201), segments the management information and adds the segmentation number (step 202).

Then, it is judged whether point information is issued or not (step 203), and when the point information is issued (YES in step 203), it is judged that a data amount of the point information does not fill the data amount of the single packet in the aforesaid packet communication and a difference between the data amount of the point information and the data amount of the single packet in the packet communication is larger than the data amount of the segment management information to which the segmentation number is added (step 204). And, when the difference is larger (YES in step 204), segment management information is added to the point information to generate packet data (step 205), which is then sent to the portable telephone 130 (step 206).

The automatic vending machine 110 repeats the aforesaid steps 203 to 206 until all the segment management information generated from the same management information is transmitted, namely the whole generated management information is completely transmitted (step 207).

Figure 4:
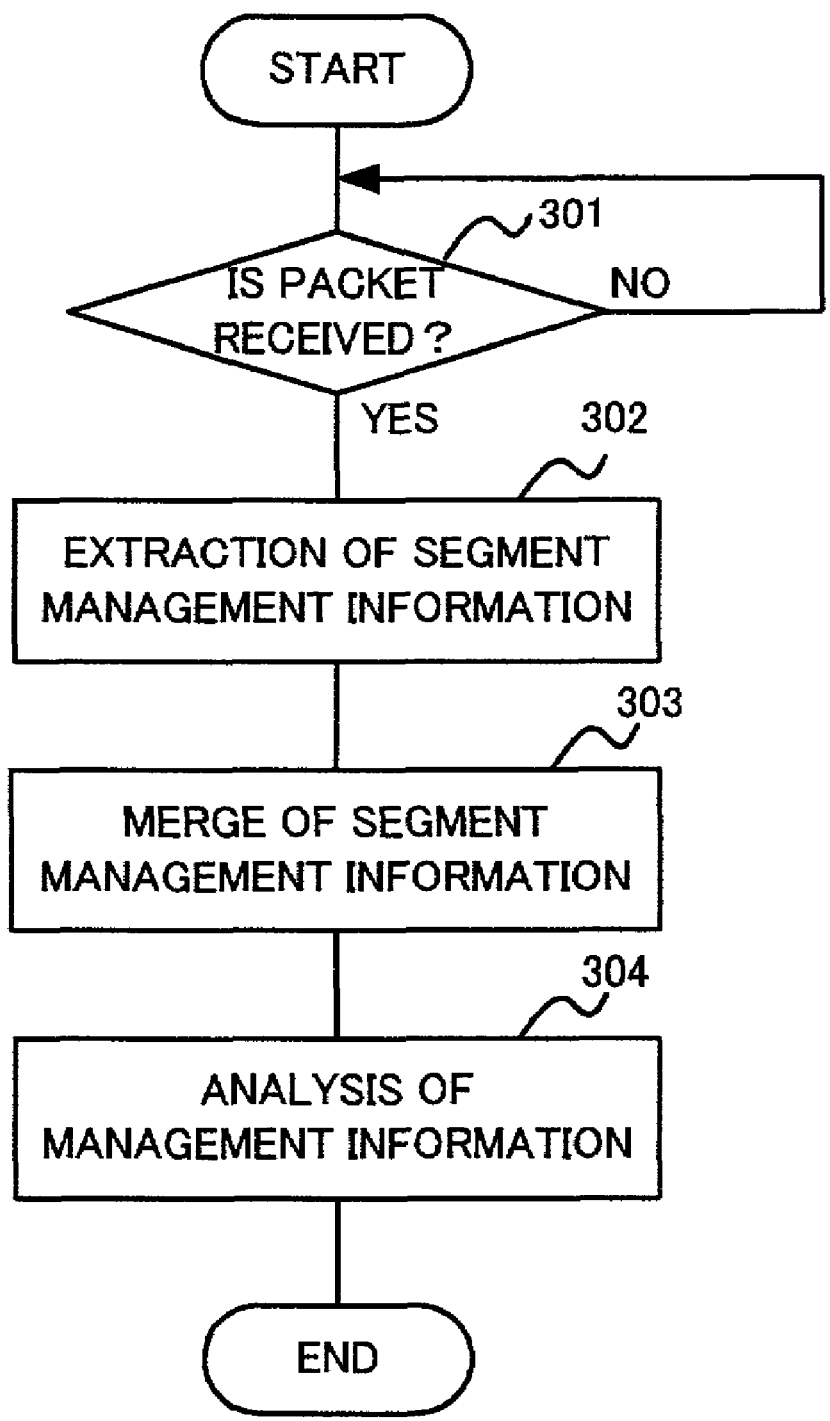
FIG. 4 is a flow chart showing a flow of an operation of the data center shown in FIG. 2.

FIG. 4 is a flow chart illustrating a flow of the operation by the data center 153 of FIG. 2.

In FIG. 4, when the data center 153 receives packet data (YES in step 301), it extracts management information from the received packet data (step 302) and restores the original management information on the basis of the segmentation number added to the extracted management information and the identification information of the automatic vending machine (step 303).

Subsequently, it analyzes the merged management information (step 304) and manages the automatic vending machine 110 according to the analyzed results.

Some users do not send the acquired point information to the data center 153 for any reason. In such a case, the segment management information added to the point information does not reach the data center 153, and a burst error is caused, disabling restoration of the original management information. Accordingly, it is desirable to take such measures that the original management information is data-scrambled.

It may also be configured that the management information of the automatic vending machine is sent without segmenting if it fits in an extra portion of the point information within the single packet without segmenting.

What is claimed is:

1. A promotion system comprising:
    a plurality of automatic vending machines for selling commodities;
    a center unit; and
    a portable telephone carried by a user who purchases a commodity through the automatic vending machine and capable of communicating with the center unit, wherein each of the automatic vending machines comprises:
    point information generating means for generating point information including a point acquired by the user by a purchase of the commodity in sales processing of the commodity;
    management information adding means for adding management information of the automatic vending machine to the point information within a range of a communication charging unit content when a data content of the point information generated by the point information generating means is smaller than the communication charging unit content of the portable telephone; and
    point information issuing means for issuing the point information to which the management information is added by the management information adding means to the user;
    the portable telephone comprises:
    sending means for sending the point information issued by the point information issuing means while adding identification information of the user to the point information;
    the center unit comprises:
    receiving means for receiving the point information sent by the sending means; separating means for separating the management information from the point information received by the receiving means;
    automatic vending machine managing means for the management information segmented by the separating means corresponding to each of the automatic vending machines
    point information managing means for managing the point information corresponding to the user identification information.

2. The promotion system according to claim 1, wherein the sending means assembles the point information to which the management information is added into a packet, sends the packet to the center unit, and the communication charging unit content of the portable telephone is an information content of the portable telephone that can be sent by a single packet.

3. The promotion system according to claim 2, wherein: the management information adding means adds the management information to the point information when the management information is smaller than a difference between the point information and the information content which can be sent by the single packet; and segments the management information of the automatic vending machine and adds the segment management information to the point information when the management information is larger than the difference between the point information and the information content which can be sent by the single packet.

4. The promotion system according to claim 3, wherein: the segment management information contains a segmentation number indicating a segmentation order of the management information and identification information of the automatic vending machine; and the center unit contains merging means which merges the management information from plural pieces of segment management information on the basis of the segmentation number and the identification number of the automatic vending machine.

5. The promotion system according to claim 1, wherein the point information issuing means is provided with communication means which communicates with the portable telephone to issue the point information to the user.

6. The promotion system according to claim 1, wherein the management information of the automatic vending machine contains sales information, stock information, failure information and the like of the automatic vending machine.

7. The method of managing an automatic vending machine according to claim 6, wherein the management information contains sales information, stock information, failure information and the like of the automatic vending machine.

8. The method of managing an automatic vending machine according to claim 6, wherein the automatic vending machine issues the point information through the communication with the portable telephone.

9. A method of managing an automatic vending machine using a promotion system that comprises a plurality of automatic vending machines for selling commodities; a center unit for managing a point acquired by a user in a purchase of a commodity by the automatic vending machine; and a portable telephone carried by a user who purchases a commodity through the automatic vending machine and capable of communicating with the center unit, wherein
    the automatic vending machine generates, by point information generating means, the point information including a point acquired by the user by the purchase of the commodity in sales processing of the commodity; adds, by management information adding means, a management information of the automatic vending machine to the point information within a range of a communication charging unit content when a data content of the point information generated by the point information generating means is smaller than the communication charging unit content of the portable telephone; and issues, by point information issuing means, the point information to which the management information is added by the management information adding means to the user;

the portable telephone sends, by sending means, the point information issued by the point information issuing means while adding identification information to the point information; and the center unit receives, by receiving means, the point information sent by the sending means; separates, by separating means, the management information from the point information received by the receiving means; manages, by automatic vending machine managing means, the management information segmented by the separating means corresponding to each automatic vending machine; and manages, by point information managing means, the point information corresponding to the user identification information.

10. The method of managing an automatic vending machine according to claim 9, wherein the point information is assembled as a packet and is sent to the center unit, and the charging unit information content of the portable telephone is an information content which can be sent by a single packet in the packet communication.

11. The method of managing an automatic vending machine according to claim 10, wherein:

the automatic vending machine adds the management information to the point information and shows the point information, to which the management information is added, to the user when the management information is smaller than a difference between the point information and the information content which can be sent by the single packet, and when the management information is larger than the difference between the point information and the information content which can be sent by the single packet, the automatic vending machine segments the management information of the automatic vending machine, and adds the segment management information to the point information.

12. The method of managing an automatic vending machine according to claim 11, wherein:

the segment management information contains a segmentation number indicating a segmentation order of the management information and identification information of the automatic vending machine, and the center unit merges to obtain the management information from plural pieces of segment management information on the basis of the segmentation number and the identification information of the automatic vending machine.

* * * * *